Dec. 7, 1971   M. A. MARRONI, JR., ET AL   3,624,839
METHOD OF FORMING A ROOT CORD RESTRAINED CONVOLUTE SECTION
Filed Dec. 20, 1968

INVENTORS
MICHAEL A. MARRONI JR.
JOHN J. KORABOWSKI

BY *Melvin Pearson Williams*

ATTORNEY

United States Patent Office 3,624,839
Patented Dec. 7, 1971

3,624,839
METHOD OF FORMING A ROOT CORD RESTRAINED CONVOLUTE SECTION
Michael A. Marroni, Jr., Weatogue, Conn., and John J. Korabowski, Springfield, Mass., assignors to the United States of America as represented by the Administrator of the National Aeronautics and Space Administration
Filed Dec. 20, 1968, Ser. No. 785,615
Int. Cl. A62b *17/00*
U.S. Cl. 2—2.1
2 Claims

ABSTRACT OF THE DISCLOSURE

Root cords utilized to constrain restraint fabric so as to form convolutes in a pressurized suit are slidably disposed on the fabric, thereby permitting fabrication of root restrained fabric suit sections from sheets of fabric, and also permitting adjustability of root diameters to vary the sizes of suits, and to accommodate minor tailored changes to improve comfort and mobility when the suit is being worn. cords are restrained by stitching and cloth tunnels.

BACKGROUND OF THE INVENTION

Field of invention

This invention relates to pressurized suits of the type utilized in high altitude aviation and space exploration, and more particularly to convolute-forming root cords therefor.

Description of the prior art

In pressurized suits known to the prior art, the most common convolute configuration includes convolutes molded entirely of rubber, or of cloth and rubber molded into a configuration of convolutes. On the other hand, suits have been made utilizing restraint fabric with the convolutes added in the form of rings or pre-built cord circlets. These are placed over the fabric after the fabric has been formed into generally tubular sections as necessary to accommodate the needs of various portions of the pressurized suit.

Suits of either type, and similar suits known to the prior art, are not only very difficult and expensive to construct, but are absolutely fixed in size once they are manufactured, and cannot be adjusted. Furthermore, the sizing of each suit during the manufacturing process either requires a number of different sized molds, or completely different sets of rings or cord circlets for the various portions of the space suit to provide various sizes necessary to accommodate the intended wearer.

SUMMARY OF INVENTION

The object of the present invention is to provide an improved root restrained convolute, and methods of making the same, for pressurized suits.

According to the present invention, root restrained fabric convolute sections for a pressurized suit are formed by securing straight cords at distinct points along flat patterned pieces or sheets of fabric, the fabric thereafter being closed upon itself to form generally tubular sections, the cords then being drawn up and secured so as to form convolute roots. According still further with the present invention, the sizing of the cords may be altered either during the manufacturing process, or after the suit is donned by the wearer, both while in the pressurized condition and while in the unpressurized condition, so as to tailor the suit more nearly to the needs of the intended wearer. According to exemplary embodiments of the invention, the cords may be slidably restrained on cloth by stitching or by cloth tunnels.

The present invention provides an extremely simple, low cost and reliable method of manufacturing root restrained fabric convolute sections. It is also permits making suits of various general sizes utilizing the same method, the only difference being in the size of pieces of fabric used as starting material and a difference in the amount of cord which is drawn up before tying in the forming of convolutes. The invention permits tailoring individual portions of convolute sections to suit the needs of the individual wearer.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
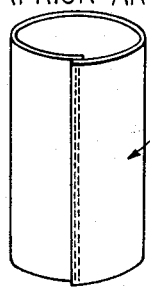
FIG. 1 is a perspective of a tubular section of fabric utilized as starting material in the formation of a root restrained fabric convolute section according to the prior art.
Figure 2:
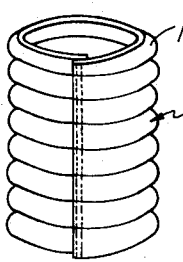
FIG. 2 is a perspective view of a convolute section formed in accordance with the prior art.

Referring now to FIG. 1, a typical root-restrained convolute section known to the prior art is assembled by first closing a piece of fabric upon itself and stitching it so as to form a cylinder 10. Thereafter, rings or cord circlets are slipped over the tubular fabric section 10 so as to form convolutes 12, as illustrated in FIG. 2. It can be appreciated that the size of any given convolute section, which must vary from suit to suit in order to accommodate the different sizes of intended wearers, can be altered only if various sized rings or cord circlets are provided for the root restraints. Additionally, once formed, there is no way to alter the individual size of, or to adjust the relative sizes between, various convolutes in the given section, in order to increase comfort and mobility by tailoring the convolute section to the individual needs of its intended wearer.

Figure 3:
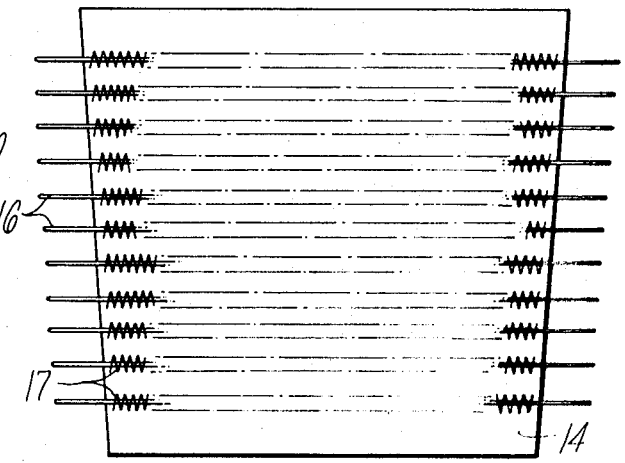
FIG. 3 is a plan view of a piece of fabric starting material having root restraint cords slidably disposed thereon in accordance with one embodiment of the invention.
Figure 4:
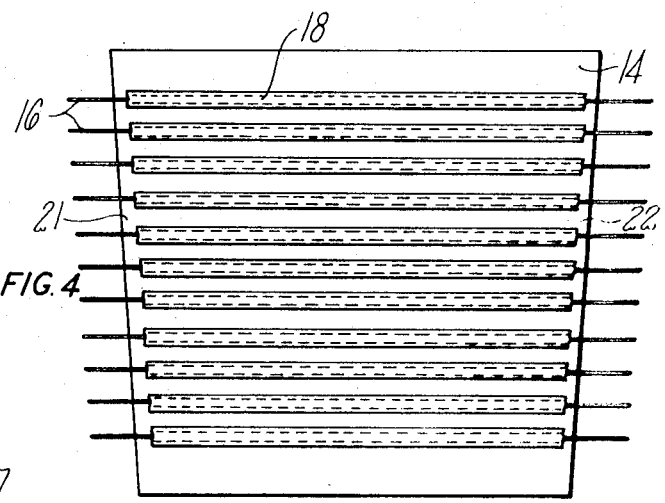
FIG. 4 is a plan view of an alternative embodiment of the present invention.

According to the present invention, a root restrained fabric convolute is formed by starting with a sheet of fabric 14 (FIG. 3), which has a plurality of straight root cords 16 laid across it, the cords being positioned relative to the fabric 14 in accordance with the desired spacing of roots in the final convolute section. As illustrated in FIG. 3, the cords 16 are disposed on a fabric 14 by zig-zag stitches, as is described and claimed in a co-pending application of the same assignee entitled Convolute Section and Method of Manufacturing Therefor, Ser. No. 785,617 filed on even date herewith by Korabowski et al. As illustrated in FIG. 4, cloth tunnels may be formed by stitching long narrow pieces of fabric 18 onto the main fabric section 14 so as to provide tunnels within which the various cords 16 can slide. As an alternative, the cords 16 may be disposed in some other fashion on the fabric 14, so long as they are slidable.

Before the cords 16 are laid over the fabric 14 (whether the securing method of FIG. 3 or of FIG. 4 is utilized), the cords may be marked so as to identify the desired final length of cord necessary to provide a root of a suitable diameter for the particular convolute section being fabricated. This may take the form of small pieces of thread having a color different from that of the root cords 16, or it may be an ink mark or other suitable mark. Because of the variety and the simplicity of such, the marks are not illustrated in the figures herein.

Figure 6:
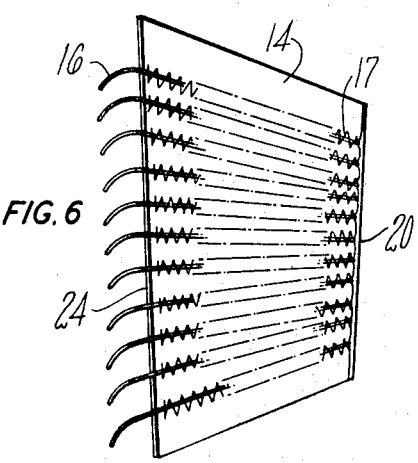
FIG. 6 is a side elevation of the embodiment of FIG. 5 when the starting material is closed upon itself so as to form a generally tubular section.
Figure 7:
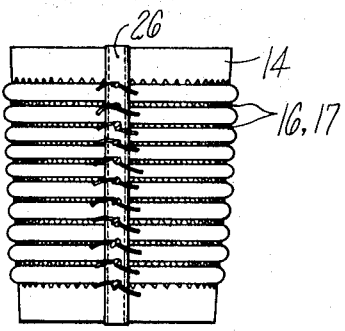
FIG. 7 is a rear elevation of the embodiment of FIGS. 5 and 6 when a seam, utilized to close the fabric on itself so as to form a tubular section, is foreshortened.
Figure 5:
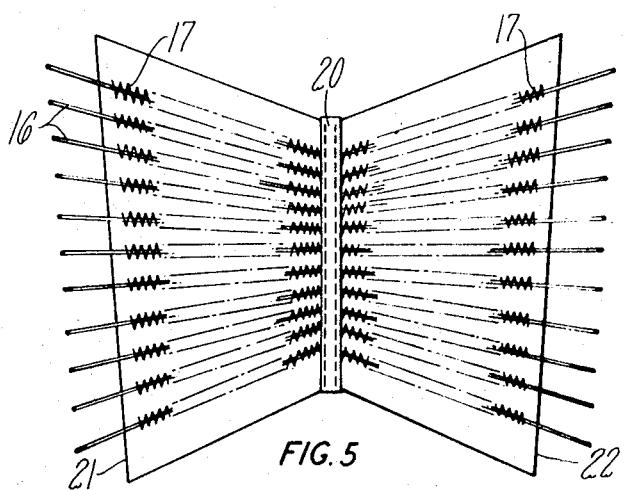
FIG. 5 is a front elevation of an embodiment of the invention, which practices the present invention in a foreshortened convolute section, when partially fabricated.

The formulation of a convolute section may be performed in various ways, only a pair of which are described herein. A first way is illustrated in FIGS. 5–7 wherein a foreshortened convolute section is fabricated, in accordance with the teachings of a co-pending application of the same assignee entitled Foreshortened Convolute Section for a Pressurized Suit, Ser. No. 785,710 filed on even date herewith by M. A. Marroni.

In FIG. 5, a restraint tape 20 has been placed along the center of the fabric 14 over the cords 16 and stitches 17. The restraint tape 20 has been sewed to the fabric 14 as pieces of cloth are puckered under it, so as to more or less uniformly foreshorten the fabric 14 underneath the restraint tape 20, while securing the tape 20 to the fabric 14. Thus, if the fabric 14 were initially ten inches long, it may, for instance, become seven inches long as a result of puckering or bunching of the fabric 14 under the restraint tape 20. The next step is illustrated in FIG. 6; the fabric 14 has been closed upon itself so as to form a cylinder, the edges 21 and 22 (FIG. 5) have been joined at a seam 24 (FIG. 6) so as to form a generally cylindrical or tubular tapered section which is, however, skewed due to the fact that the side underneath the restraint tape 20 has been foreshortened, whereas the side along the seam 24 has not as yet been foreshortened. In FIG. 7, an additional restraint tape 26 has been sewn over the seam 24 so as to foreshorten the assembly along the seam 24. In this case, the restraint tape 26 is provided with a plurality of holes, one for each of the root cords 16. In a restraint tape made of woven nylon, or other plastic-like material, the holes are conveniently formed by fusion, such as with a soldering iron; this not only is an easy way to form a hole, but fuses the edges of the hole so as to prevent ravelling of the cloth. Then the root cords can be drawn up to the point where the markers are visible in the holes at each end of each root cord, and each root cord can be tied, thus completing the roots and forming a convolute section.

Figure 8:
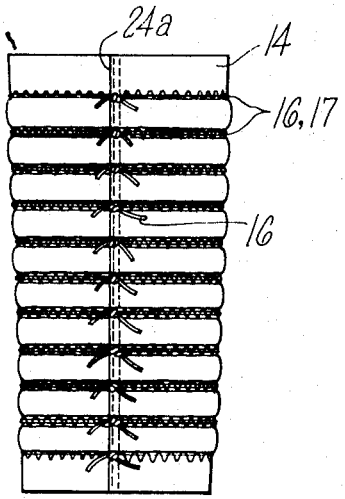
FIG. 8 is a front elevation of another embodiment of the present invention in which the convolute section is not foreshortened.

On the other hand, the invention can be practiced more simply in a section which is not foreshortened (as may be desired for a different part of a pressurized suit) simply by closing the edges 21, 22 (FIG. 4) upon each other and forming a seam 24a, as shown in FIG. 8. Thereafter, the root cords may be drawn up until the markers show, and knots formed in the cords thus completing the convolute roots and a convoluted fabric section.

Once an entire pressurized suit is fabricated, including some sections made in accordance with the present invention, those sections may be adjusted slightly in order to accommodate the anatomy of the wearer. For instance, one wearer may have very thick calves, whereas another wearer may have thinner calves. This difference in their anatomy may be compensated for by a slight amount of shaping of the convolute section through readjustments of various cords therein. Additionally, if, when pressurized, the suit shows tendencies toward shear or cutting-in at various points, this may be partially accommodated by readjusting the length of one or more roots and therefore one or more convolute sections in order to provide a pressurized suit which more nearly conforms to the needs of its wearer.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. In the method of forming a root cord restrained fabric convolute section for a pressurized suit the steps of:
   providing a plurality of root cords having a length greater than the desired circumferential length of roots in the convolute section being formed;
   providing a sheet of fabric shaped in such a manner that when two opposite ones of its edges are connected together it will provide a substantially tubular section of an appropriate size and shape;
   slidably restraining a plurality of said root cords on said cloth in a fashion so that each of said root cords is slidable along its length, said root cords being spaced apart a distance equivalent to the desired axial length of unrestrained convolutes in the convolute section being formed;
   forming said fabric, with said cords slidably disposed thereon, into a generally tubular section having its axis perpendicular to said cords; and
   sliding said cloth away from each end of each of said root cords a proper distance and tying said root cords to thereby form in said fabric at least one convolute root having a circumference less than the circumference of said tubular section.

2. The method according to claim 1 including the step of:
   marking on each of said cords, near opposite ends thereof, the desired final circumferential length of the cords prior to restraining said cords on said cloth;
   and wherein said tying step comprises adjusting said cloth with respect to each of said cords and tying said cords so as to form at least one rooted convolute, the root circumference of which is determined by the marks on said cords.

References Cited
UNITED STATES PATENTS

| | | | |
|---|---|---|---|
| 2,392,992 | 1/1946 | Martin | 2—2.1 |
| 2,410,632 | 11/1946 | Colley et al. | 2—2.1 A |
| 2,939,148 | 6/1960 | Hart et al. | 2—2.1 |
| 2,954,562 | 10/1960 | Krupp | 2—2.1 A |
| 2,967,305 | 1/1961 | White et al. | 2—2.1 A |
| 2,391,282 | 12/1945 | Van Orman | 2—2.1 |
| 3,422,458 | 1/1969 | Schueller | 2—2.1 |

FOREIGN PATENTS

| | | | |
|---|---|---|---|
| 836,903 | 6/1960 | Great Britain | 138—121 |

JORDAN FRANKLIN, Primary Examiner

G. H. KRIZMANICH, Assistant Examiner